US012269506B2

(12) United States Patent
Funke et al.

(10) Patent No.: US 12,269,506 B2
(45) Date of Patent: Apr. 8, 2025

(54) AUTONOMOUS VEHICLE OPERATIONS RELATED TO DETECTION OF AN UNSAFE PASSENGER PICKUP/DELIVERY CONDITION

(71) Applicant: Zoox, Inc., Foster City, CA (US)

(72) Inventors: Joseph Funke, Redwood City, CA (US); Steven Cheng Qian, San Francisco, CA (US); Genie Kim, Seoul (KR); Zheyuan Xie, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 459 days.

(21) Appl. No.: 17/550,969

(22) Filed: Dec. 14, 2021

(65) Prior Publication Data
US 2023/0182772 A1    Jun. 15, 2023

(51) Int. Cl.
| | |
|---|---|
| *B60W 60/00* | (2020.01) |
| *B60Q 9/00* | (2006.01) |
| *B60W 30/14* | (2006.01) |
| *B60W 40/04* | (2006.01) |

(Continued)

(52) U.S. Cl.
CPC ......... *B60W 60/0011* (2020.02); *B60Q 9/008* (2013.01); *B60W 30/146* (2013.01); *B60W 40/04* (2013.01); *B60W 60/0015* (2020.02); *B60W 60/00253* (2020.02); *B60W 60/00274* (2020.02); *G06N 20/00* (2019.01); *G06Q 50/40* (2024.01); *B60W 2540/041* (2020.02);
(Continued)

(58) Field of Classification Search
CPC .......... B60W 60/0011; B60W 30/146; B60W 40/04; B60W 60/0015; B60W 60/00253; B60W 60/00274; B60W 2540/041; B60W 2554/4041; B60W 2554/4042; B60W 2554/80; B60Q 9/008; G06N 20/00; G06Q 50/40
See application file for complete search history.

(56) References Cited

U.S. PATENT DOCUMENTS

| 9,551,992 B1 * | 1/2017 | Barton-Sweeney .. B60W 10/20 |
| 10,156,449 B2 * | 12/2018 | Colijn ..................... G01C 21/34 |
| 11,181,927 B2 * | 11/2021 | Thakur .............. G01C 21/3407 |

(Continued)

FOREIGN PATENT DOCUMENTS

CN    108700876 A    10/2018

OTHER PUBLICATIONS

The PCT Search Report and Written Opinion mailed Apr. 20, 2023 for PCT application No. PCT/US2022/052731, 14 pages.

*Primary Examiner* — Navid Z. Mehdizadeh
*Assistant Examiner* — Shelley Marie Osterhout
(74) *Attorney, Agent, or Firm* — Lee & Hayes, P.C.

(57) ABSTRACT

A passenger may be rather vulnerable to safety risks during pickup and/or drop-off of a passenger by a vehicle. To mitigate or eliminate such risk, the vehicle may determine an endpoint for a vehicle route to pickup or drop-off a passenger at a location. The vehicle may determine an estimated path between the endpoint and the location and may determine a safety confidence score by a machine-learned model for the estimated path and/or may predict a trajectory of a detected object to ascertain whether the estimated path is safe. The vehicle may execute any of a number of different mitigation actions to reduce or eliminate a safety risk if one is detected.

20 Claims, 6 Drawing Sheets

(51) Int. Cl.
  *G06N 20/00*     (2019.01)
  *G06Q 50/40*     (2024.01)
(52) U.S. Cl.
  CPC ............... *B60W 2554/4041* (2020.02); *B60W 2554/4042* (2020.02); *B60W 2554/80* (2020.02)

(56) References Cited

U.S. PATENT DOCUMENTS

| | | | |
|---|---|---|---|
| 2016/0221500 A1* | 8/2016 | Sakai | B60Q 9/008 |
| 2017/0090480 A1 | 3/2017 | Ho et al. | |
| 2018/0136656 A1* | 5/2018 | Rasmusson, Jr. | B60W 60/00253 |
| 2020/0062242 A1* | 2/2020 | Hayakawa | B60R 1/27 |
| 2020/0341466 A1 | 10/2020 | Pham et al. | |
| 2021/0049911 A1* | 2/2021 | Fremlin | G08G 1/202 |
| 2021/0108929 A1* | 4/2021 | Zhang | G01C 21/3438 |
| 2021/0163021 A1 | 6/2021 | Frazzoli et al. | |
| 2023/0058007 A1* | 2/2023 | Somanath | G06V 20/58 |

\* cited by examiner

AUTONOMOUS VEHICLE OPERATIONS RELATED TO DETECTION OF AN UNSAFE PASSENGER PICKUP/DELIVERY CONDITION

BACKGROUND

Even though an autonomous vehicle may successfully navigate a roadway, it may be unable to successfully deliver or pickup a passenger safely. Passenger pickup and/or delivery scenarios may differ vastly from normal roadway navigation. For example, passenger pickup and/or delivery may include stopping at unusual places in a roadway, which may mean that various roadway markers may no longer provide guidance that may be used by the autonomous vehicle to navigate. This may put a passenger or potential passenger in safety-compromising situations.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
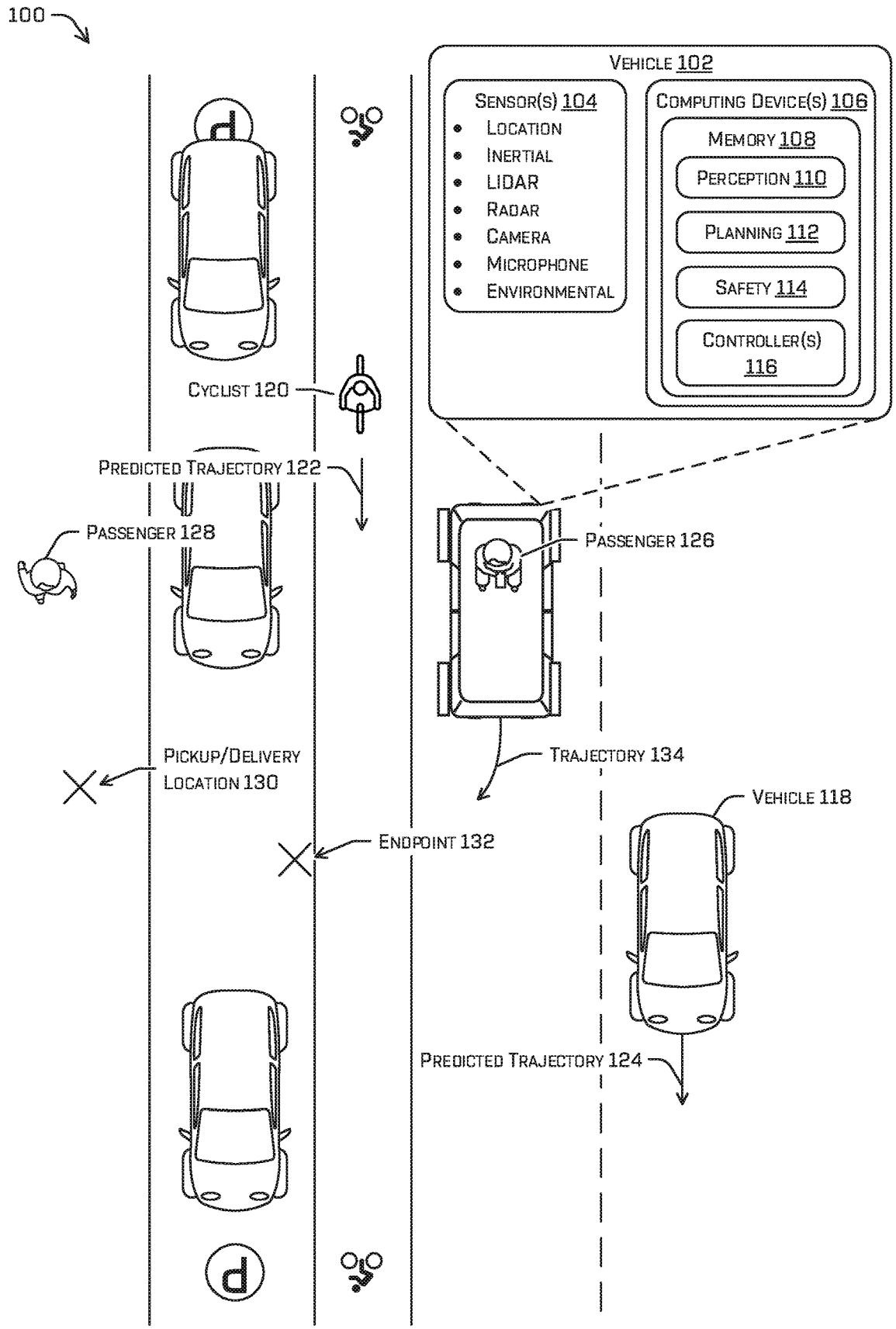
FIG. 1 illustrates an autonomous vehicle and an example scenario in which an autonomous vehicle may deliver and/or pickup when an unsafe condition is detected by the autonomous vehicle.

As discussed above, an autonomous vehicle may encounter entirely different scenarios in dropping off or picking up a passenger than in navigating nominal road conditions. This application relates to techniques for mitigating the risk presented to a passenger during pickup and/or drop-off by a vehicle. The techniques discussed herein may increase the safety of passengers that interact with an autonomous vehicle by configuring the autonomous vehicle with various components discussed herein to mitigate and/or eliminate unsafe conditions during pickup and/or drop-off of a passenger.

The techniques discussed herein may include receiving a pickup request or a delivery request associated with a passenger (or potential passenger) of a vehicle. For simplicity, passengers and potential passengers (e.g., passengers requesting pickup) are not distinguished, nor are the number of passengers. A pickup or delivery request may be received from a computing device associated with one or more passengers and/or via an input/output device that is part of the vehicle. In some examples, the request may identify a number of the passengers to be dropped off or picked up, which may be one or more, although a single passenger is primarily discussed herein for simplicity. In some examples, the request may identify specific GPS coordinates, a type of map feature (e.g., airport, bus stop, train stop, park, viewpoint), a business, building, event, a region (e.g., a neighborhood name, a city portion name), a block, and/or the like, any of which may be combined. In some examples, depending on the type of request, such as where specific coordinates are not specified, the vehicle may determine an endpoint associated with the route based at least in part on the location identified in the request. In some examples, this may include modifying particular coordinates received in association with a request to a nearest pedestrian-safe portion of an environment within a threshold distance of a portion of the environment accessible to vehicles, such as a roadway, parking lot, parking space, or the like. In additional or alternate examples, determining the endpoint may include determining a block of a city associated with the location or a region around the location (e.g., a 25 meters radius around the location, regardless of the type of location identified).

In some examples, the vehicle may determine a route from a current position of the vehicle to the endpoint to pickup the passenger and/or to drop off a passenger. Using sensor and/or map data, the vehicle may determine that the vehicle is approaching the endpoint, such as by determining, using sensor data and/or map data, that the vehicle is within a threshold distance of the endpoint. For example, the distance may be a static distance, e.g., 10 meters, 25 meters, 30 meters, any other distance; a distance based on a speed of the vehicle or a speed limit of a roadway upon which the vehicle is traveling (e.g., the distance may increase as the speed and/or speed limit increases); and/or the distance may be based at least in part on a map feature, such as once the vehicle reaches a block associated with the endpoint, is half a block away from the endpoint, turns into a parking lot, or the like. The vehicle may engage a passenger safety system upon determining that the vehicle is equal to or less than the specified distance from the endpoint.

The passenger safety system may determine a safety confidence score associated with the pickup and/or delivery of a passenger and, in instances where the confidence score indicates an unsafe condition (e.g., such as an instance where the safety confidence score does not meet a threshold), the passenger safety system may override or transmit data indicating the unsafe condition to a planning component of the vehicle that controls vehicle operations. This override or transmission may cause the vehicle to operate differently to mitigate or eliminate the unsafe condition.

In some examples, the passenger safety system may determine the safety confidence score by a machine-learned (ML) model and/or based on a prediction determined by a perception component of the autonomous vehicle. The perception component may use sensor data to detect the presence of an object and determine a prediction associated with the object. In some examples, the perception component may repeat this over time and may track sensor data and/or predictions associated with a same object; this data may be amalgamated into a track. The track may identify a historic, current, and/or predicted position, heading, velocity, acceleration, and/or classification associated with the object. See U.S. patent application Ser. No. 16/779,576, filed Jan. 31, 2020. In some examples, the perception component may provide at least a predicted trajectory associated with a detected object to the passenger safety system. The predicted trajectory determined by the perception component may identify a predicted position, heading, velocity, and/or acceleration associated with a future time and/or any intermediate times before the future time. A confidence score associated with any of such data may also be determined by the perception component and provided to the passenger safety system, in some examples. Perception data associated with a current position, etc. of the object may additionally be provided to the perception component.

The passenger safety system may determine an estimated path that the passenger is likely to take between the location identified in the request and the autonomous vehicle, whether by leaving the vehicle or by traveling from the location the vehicle. A path may identify a line, curve, region (e.g., a corridor), or the like associated with the estimated path of the passenger between the location identified in the request and a current or planned pose (i.e., position and/or orientation) of the autonomous vehicle. In various examples, such a path may be further associated with one or more times that the pedestrian will be at points along the detected path. The planned pose may be based at least in part on a route determined by the vehicle to arrive at the endpoint. In other words, the planned pose may be a target pose that the autonomous vehicle has determined to reduce a distance between the vehicle and the pickup/drop-off location subject constraints determined based at least in part on sensor data (e.g., object(s) in the environment, conditions detected by the vehicle), map data, and/or unsafe condition constraints as determined herein. The location identified by the request may differ from the endpoint, as discussed above—the endpoint may be a location determined by the vehicle that is feasible for picking up or dropping off the passenger. The planned pose may be based at least in part on the endpoint, then.

The passenger safety system may determine the estimated path based at least in part on the planned pose of the vehicle and the location identified in the request. The passenger safety system may determine a safety confidence score associated with the planned pose and/or a current pose of the vehicle based at least in part on the estimated path of the passenger and a predicted trajectory of a detected object. In some examples, the passenger safety system may determine a shortest distance between any portion of the estimated path and any portion of the predicted trajectory. If the distance does not meet a threshold distance, the passenger safety system may cause mitigating actions to occur. The threshold distance may decrease based at least in part on determining, based at least in part on sensor data, an average speed of traffic around the vehicle and/or based at least in part on a current and/or predicted speed and/or acceleration of the object. Of course, while discussed as a planned path, the disclosure is not meant to be so limiting. Similar operations may be determined for a highest probable region in the environment the pedestrian may travel to arrive at the planned pose, an aggregation of scores associated with multiple potential paths of the pedestrian to arrive at the planned pose (any number of which associated with a likelihood of travelling that particular path), and the like.

Additionally or alternatively, the distance may be used to determine a safety confidence score. For example, determining the safety confidence score may comprise determining a weighted sum of the distance, the average (or median) speed of traffic, the current and/or predicted speed and/or acceleration of the object, and/or a classification of the object. If a weighted sum is used, the respective values may be normalized and/or assigned a constant, such as the object classification. In an additional or alternate example, the distance and/or predicted trajectory may be part of an input provided to a machine-learned (ML) model trained to regress the safety confidence score. The input data to the ML model may comprise a visibility indication, whether the autonomous vehicle is holding up traffic, a region that the vehicle determines may be occluded to the passenger, a current and/or predicted trajectory of an object, an indication of whether an emergency or law enforcement vehicle has been detected as approaching, an average or median speed of traffic/other objects detected by the vehicle that are in the roadway or a salient portion of a map, and/or the existence of any potential blind spots (e.g., occluded region(s)) from the passenger's perspective.

If an unsafe condition is detected (e.g., the distance between a predicted trajectory and an estimated path of the passenger doesn't meet a distance threshold and/or the safety confidence score is below a threshold), the passenger safety system may cause a mitigation action to occur. For example, the passenger safety system may override the planning component with the mitigation action or, in an additional or alternate example, may transmit the unsafe condition and/or the safety confidence score to the planning component for the planning component to cause the mitigation action to occur. In at least some such examples, the vehicle may cause a signal to be sent (e.g., directly, via a central server, etc.) to the passenger to cause presentation of information to the passenger (e.g., via their mobile device) of the unsafe stopping point, to inform the passenger to move to another location or wait for a safe time for ingress or egress, and/or to inform the passenger of a mitigation action the vehicle is taking.

A variety of mitigation actions may be accomplished by the vehicle. The vehicle may alter operation of the vehicle, such as by modifying a trajectory for controlling the vehicle and/or by altering operation of one or more components of the vehicle, such as a door, window, window tinting, and/or the like. In some examples, modification of the trajectory may be based at least in part on the passenger being unable to enter/exit the vehicle for a variety of reasons including, but not limited to, blocked access, a curb prohibiting strollers and wheelchairs, etc. where the modified trajectory may be selected to accommodate for such obstacles. Modifying the trajectory may include slowing the vehicle to time arrival of the vehicle at a planned pose associated with an endpoint such that an unsafe condition is mitigated (e.g., an object passes), halting progress of an operation of the vehicle (e.g., pausing or preventing opening of door(s), requiring a door opening device to be actuated multiple times before opening, stopping the vehicle), recalculating the endpoint (e.g., which may include expanding a zone used by the vehicle to determine the endpoint), determining a trajectory that increases a number of endpoints that are possible as compared to other trajectory(ies), circling the block and coming back, etc. In some examples, the vehicle may transmit a notification of the unsafe condition and/or the mitigation action to a computing device associated with the passenger and/or via a display and/or emitters of the vehicle.

In some examples, location and/or endpoint, sensor data, perception data, map data, and/or mitigation action may be stored in a log of the vehicle and/or transmitted to a distributed computing system. This log data may be used to proactively modify endpoints determined in association with any locations received that are associated with the location or that are within a threshold distance of the location.

The techniques discussed herein may improve the safety of autonomous vehicles and the defensive behavior an autonomous vehicle may take to protect passengers and prospective passengers from unsafe conditions. The techniques discussed herein also increase the number of mitigation actions available to a vehicle.

Example Scenario

FIG. 1 illustrates an example scenario 100 including a vehicle 102. In some examples, the example scenario 100 may be a real-world scenario and/or the example scenario 100 may be a representation of a real-world scenario modeled as a simulated scenario.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 104 on the vehicle 102 and in a simulation, one or more of sensor(s) 104 may be simulated. In some examples, the position of a simulated sensor may correspond with a relative position of one of the sensor(s) 104 to the vehicle 102.

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, safety component 114, and/or controller(s) 116. In some examples, the perception component 110 and/or planning component 112 may comprise different portions of the safety component 114. The perception component 110 and/or the planning component 112 may include one or more machine-learned (ML) models and/or other computer-executable instructions. In some examples, the controller(s) 116 may include instructions stored in a memory, although the controller(s) 116 may additionally or alternatively include a specialized computing device that comprises hardware and/or software for actuating drive components of the vehicle 102.

In general, the perception component 110 may determine what is in the environment surrounding the vehicle 102 and the planning component 112 may determine how to operate the vehicle 102 according to information received from the perception component 110. The perception component 110 may generate perception data, which may comprise data associated with static objects in the environment (static data) and/or data associated with dynamic objects in the environment (dynamic data). For example, the static data may indicate a likelihood that an object exists at a location in the environment and the dynamic data may indicate a likelihood that an object occupies or will occupy a location in the environment. In some instances, the dynamic data may comprise multiple frames associated with different times steps at intervals up to a prediction horizon (i.e., a maximum time/distance for which dynamic data is predicted). For example, the dynamic data may indicate a current position, heading, velocity, and/or the like associated with a dynamic object and at one or more future times.

The perception component 110 may additionally or alternatively determine an object classification associated with an object. An object classification may distinguish between different object types such as, for example, a passenger vehicle, a pedestrian, a bicyclist, a delivery truck, a semi-truck, traffic signage, and/or the like. The perception component 110 may additionally or alternatively determine a track associated with an object, which may comprise a historical, current, and/or predicted object position, velocity, acceleration, and/or heading. The track may additionally or alternatively associate sensor data or object detections from different times with a same object. In other words, the track may identify different object detections in time as being a associated with a same object.

The perception component 110 may additionally or alternatively comprise a prediction component that determines an estimate of a future action and/or movement (i.e., a prediction) that a dynamic object may take. In some examples, the prediction may be based at least in part on a mode of operation and/or trajectory of the vehicle. For example, the dynamic data may comprise a first prediction associated with a first vehicle mode and a first time and a second prediction associated with a second vehicle mode and the first time. The vehicle modes may include mission-level modes, such as passenger pickup, passenger transit, passenger deliver, or the like; path or trajectory-level modes such as maintaining trajectory, slowing to a stop, transitioning lanes, executing a righthand turn, or the like; and/or signal modes, such as activating a speaker, activating a turn light, flashing headlights or high beams, or the like. The autonomous vehicle's behavior and signals may affect decisions and behavior made by other entities in the vicinity of the autonomous vehicle 102 and may thereby affect the predicted motion of other objects.

In some examples, the perception component 110 may receive sensor data from the sensor(s) 104 and determine data related to objects in the vicinity of the vehicle 102 (perception data), such as the static and/or dynamic data, which may include prediction data related thereto. The perception data may include the static and/or dynamic data, a heat map (which may indicate a confidence indicating that a classification is correct and/or an indication that an object or object of a specific classification is occupying or will occupy a discrete portion of the environment, for example), object classifications associated with detected objects, instance segmentation(s), semantic segmentation(s), two and/or three-dimensional bounding boxes, tracks, etc.

In some examples, the perception component 110 may comprise a prediction component that may determine the predicted portion of the track, which may comprise a predicted position, heading, steering rate, velocity, acceleration, classification (for those classifications that are malleable, such as cyclists that may become pedestrians), etc. The prediction component may comprise a simulation component, machine-learned model, or in additional or alternate examples, the prediction component may comprise a Kalman filter or the like. The perception component 110 may be used to determine the prediction associated with an object that the perception component detects.

For example, the perception component may detect the presence of various vehicles in the example scenario 100, such as vehicle 118 and cyclist 120. The perception component may determine a predicted trajectory 122 associated with the cyclist 120 and/or a predicted trajectory 124 associated with vehicle 118. The perception component may determine current perception data associated with a detected object, such as a classification, current velocity, acceleration, etc. In some examples, some of these properties may be used together, such as to determine an average or median speed of traffic, etc. The other depicted vehicles may be detected by the vehicle 102 as being parked/not moving. In some examples, the safety component 114 may receive all or part of the perception data, such as current and/or predicted data related to a detected object. In some examples, the safety component 114 may receive such data for all objects detected; object(s) detected within a specified radius (which may be based on vehicle 102's speed and/or speed of traffic) of the vehicle 102 or a passenger; object(s) having a predicted trajectory 122 that is within a predetermined distance of an estimated path of a passenger, of the vehicle, or of a passenger; or the like.

In the illustrated example, the perception component 110 may detect the cyclist 120 based at least in part on sensor data received from the sensor(s) 104, classify the cyclist 120 as a cyclist or two-wheeled object, determine a current velocity and/or acceleration associated with the cyclist, and/or determine a predicted trajectory 122 associated with the cyclist 120. The perception component 110 may provide any of this data to the safety component 114, which may determine that the pickup of passenger 128 and/or the drop-off of passenger 126 is unsafe, at least temporarily as the cyclist has a probability meeting or exceeding some threshold probability of intersecting the planned path of the passenger 128 (e.g., as may be determined by the safety component 114). The safety component 114 may output an unsafe condition indication and/or a safety confidence score to the planning component 112.

The perception component 110 may additionally or alternatively determine route data that specifies a destination of the vehicle (although, in some examples, a route may be received from the planning component based at least in part on receiving a start and/or end position of the route), global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. The perception component 110 may be configured to detect as many objects and information about the environment as possible to avoid failing to account for an event or object behavior that should be taken into account by the planning component 112 in determining a trajectory for controlling motion of the vehicle.

The data produced by the perception component 110 may be collectively referred to as perception data. Once/as the perception component 110 generates perception data, the perception component 110 may provide the perception data to the planning component 112. In some examples, perception data may comprise outputs of sensor specific pipelines (e.g., vision, lidar, radar) and/or hybrid sensor pipelines (e.g. vision-lidar, radar-lidar).

The planning component 112 may use the perception data received from perception component 110, to determine one or more trajectories, control motion of the vehicle 102 to traverse a path or route, and/or otherwise control operation of the vehicle 102, such as door operation, emitter operation, and the like, though any such operation may be performed in various other components (e.g., localization may be performed by a localization component, which may be based at least in part on perception data). For example, the planning component 112 may determine a route for the vehicle 102 from a first location to a second location, which may be based at least in part on a mission and map data, in at least one example. In some examples, the safety component 114 may transmit a safety confidence score and/or unsafe condition to the planning component 112, which the planning component 112 may use to determine the trajectory and/or operation(s) of the vehicle 102. For a mission that includes picking up a passenger at one location and dropping the passenger off at another location (potentially with intervening waypoints), the planning component may determine a route that specifies the roadways or roadway portions to accomplish the mission. In the depicted example, the vehicle 102 may have received a request to drop off a passenger 126 and/or pickup a passenger 128. For the sake of simplicity, the pickup and/or delivery may identify a same location—the pickup and/or delivery location 130. In some examples, a pickup and/or delivery location 130 may specify a specific coordinate on a map, a building, a business, an event, a block, or a region of a city or other feature such as a parking lot (e.g., the "East end of MegaStore's parking lot").

Determining such a route may comprise determining an endpoint 132 associated with a pickup and/or delivery location 130. The endpoint 132 may identify a pose (i.g., position and/or orientation) of the vehicle 102 for picking up and/or dropping off a passenger within a region, if the request specifies a region, or as close to the location as drivable surfaces allow. The endpoint 132 may be different than the pickup/delivery location 130, in some examples. For example, the planning component 112 may determine the endpoint 132 based at least in part on map data, sensor data and/or perception data, the pickup/delivery location 130, and/or an unsafe condition if one is detected. For example, the endpoint 132 may initially be based on map data when the vehicle 102 is too far away from the pickup/delivery location 130 for a range associated with the sensor(s) 104 of the vehicle 102 to detect object(s) and other conditions near the endpoint 132. In such an example, the initial endpoint 132 may be a pose on a drivable surface that is closest to the pickup/delivery location 130. The planning component 112 may modify the endpoint 132 based at least in part on receiving an indication of detected object(s), a predicted trajectory of an object, and/or an unsafe condition from the perception component 110, as discussed in more detail herein. For example, the planning component 112 may alter a trajectory of the vehicle 102 as it approaches the initial endpoint, alter the endpoint itself (e.g., by moving the endpoint within a region, by expanding the region searched for an endpoint, by converting a specific location to a region), and/or other operations discussed herein (e.g., modifying door controls, transmitting a notification to a passenger device).

The planning component may determine, based at least in part on perception data and/or the route (including the endpoint 132), a plurality of candidate trajectories for controlling motion of the vehicle 102 in accordance with a receding horizon technique (e.g., 1 micro-second, half a second, 2 seconds, 5 seconds, 10 seconds, or any other near-term time period) to control the vehicle to traverse the route (e.g., in order to avoid any of the detected objects); and select one of the candidate trajectories as a trajectory 134 that may be used to generate a drive control signal that may be transmitted to the controller(s) 116 for actuating drive components of the vehicle 102. In order to generate such a trajectory 134, the perception component may determine controls sufficient to arrive at the position and/or orientation identified by endpoint 132. FIG. 1 depicts an example of a trajectory 134 that may ultimately be selected from among candidate trajectories according to the techniques discussed herein, represented as an arrow indicating a target steering angle, target steering rate, target velocity, and/or target acceleration for the controller(s) 116 to track, although the trajectory itself may comprise instructions for controller(s), which may, in turn, actuate a drive system of the vehicle 102. Note that, as discussed herein, the planning component 112 may additionally or alternatively control other components of the vehicle 102, such as doors, windows, emitters (e.g., sound, light, etc. emitter(s)), interior speakers and/or displays, etc.

Example System

Figure 2:
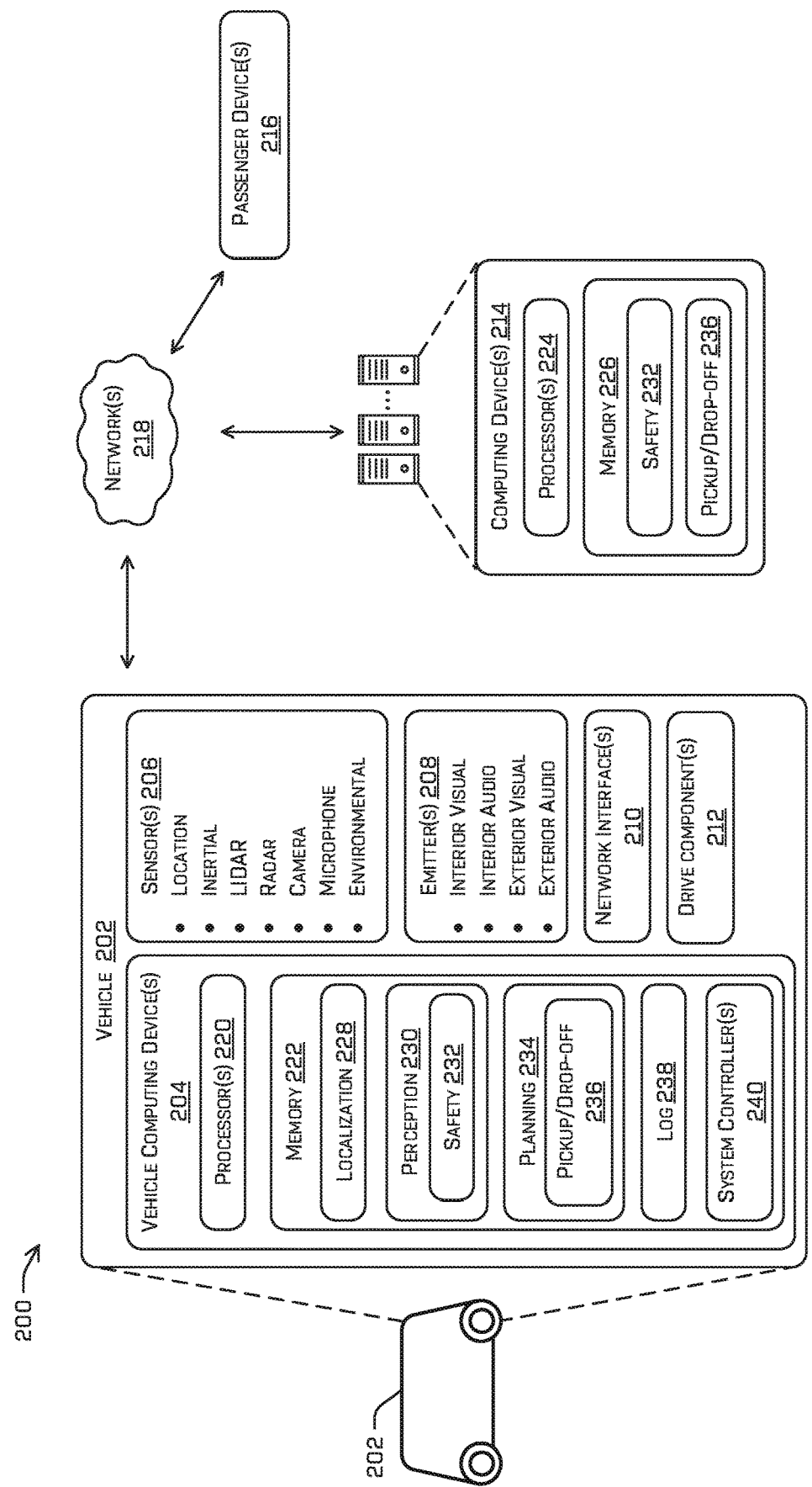
FIG. 2 illustrates a block diagram of an example autonomous vehicle architecture that comprises one or more safe delivery and/or pickup components.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, door actuators, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214 and/or passenger computing device(s) 216. In some examples, computing device(s) 214 may comprise one or more nodes of a distributed computing system (e.g., a cloud computing architecture).

A passenger computing device 216 may include, for example, a smart phone, portable computer such as a laptop or tablet, wearable device (e.g., smart glasses, smart watch, earpiece), and/or the like. Although a passenger device may be a device associated with a passenger that is discrete from device(s) of the autonomous vehicle, it is contemplated that the passenger device may be a sub-system and/or a device of the vehicle 202. Regardless, the passenger device may comprise a display and/or one or more input/output devices, such as a touchscreen, microphone, speaker, and/or the like.

In some examples, the vehicle 202 may transmit messages and/or receive messages from the passenger device. For example, the vehicle 202 may receive a pickup and/or delivery request from a passenger device and may transmit an unsafe condition and/or mitigation action notification to the passenger device. The notification may include an indication of a location, type, and/or representation of the unsafe condition and/or may indicate what the vehicle 202 is doing to mitigate the unsafe condition. In some examples, this latter notification may include indicating to the passenger instructions for overriding or interacting with the mitigation action, such as preventing a door from being opened or requiring more than one actuation of a door actuation mechanism (e.g., a physical actuator on the outside or inside of the vehicle, or a software actuator on the passenger device). In various examples, such a notification may comprise illustrating a new position and/or time for ingress/egress on a map, requesting confirmation from the passenger of the new or changed destination, and/or to inform the passenger of a mitigation action the vehicle is taking. The passenger device may additionally or alternatively be used to actuate a door, window, window tinting, and the like of the vehicle 202 (e.g., by communicating with the vehicle 202 over the network(s) 218).

The network interface(s) 210 may include physical and/or logical interfaces for connecting the vehicle computing device(s) 204 to another computing device or a network, such as network(s) 218. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 218, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 220 and memory 222 communicatively coupled with the one or more processors 220. Memory 222 may represent memory 108. Computing device(s) 214 may also include processor(s) 224, and/or memory 226. The processor(s) 220 and/or 224 may be any suitable processor capable of executing instructions to process data and perform operations as described herein. By way of example and not limitation, the processor(s) 220 and/or 224 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 222 and/or 226 may be examples of non-transitory computer-readable media. The memory 222 and/or 226 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 222 and/or memory 226 may store a localization component 228, perception component 230, safety component 232, planning component 234, pickup/drop-off component 236, log 238, and/or system controller(s) 240—zero or more portions of any of which may be hardware, such as GPU(s), CPU(s), and/or other processing units. Perception component 230 may represent perception component 110, planning component 234 may represent planning component 112, and safety component 232 and pickup/drop-off component 236 may represent the safety component 114. In other words, the safety component 114 may comprise a first portion that is part of the perception component 230 and/or a second component that is part of the planning component 234, although it is understood that the safety component 114 may be part of just one of perception component 230 or planning component 234 or it may be a completely separate component that receives data from the perception component 230 and outputs data to the planning component 234.

In at least one example, the localization component 228 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 228 may include and/or request/receive map(s) of an environment and can continuously determine a location, velocity, and/or orientation of the autonomous vehicle within the map(s). In some instances, the localization component 228 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 228 may provide data to various components of the vehicle 202 to determine an initial position of an autonomous vehicle for generating a trajectory and/or for generating map data, as discussed herein. In some examples, localization component 228 may provide, to the perception component 230, a location and/or orientation of the vehicle 202 relative to the environment, detected object(s), and/or sensor data associated therewith.

In some instances, perception component 230 may comprise a primary perception system and/or a prediction system implemented in hardware and/or software. The perception component 230 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 230 may include a prediction component that predicts actions/states of dynamic components of the environment, such as moving objects. In some examples, the perception component 230 may include a simulation component as part of the prediction portion of the perception component 230, although the prediction portion may include a kinematics-based component and/or a Kalman filter for determining a predicted position, heading, velocity, acceleration, and/or the like associated with a dynamic object. Data determined by the perception component 230 is referred to as perception data.

In some examples, the perception component 230 may comprise a safety component 232 that determines whether an unsafe condition exists for dropping off and/or picking up a passenger. The safety component 232 may comprise a deterministic algorithm that conducts the operations discussed herein, such as determining an estimated path associated with the passenger, determining a shortest distance between any point along the estimated path and a closest point of a predicted trajectory, etc., as discussed further herein. Additionally or alternatively, the safety component 232 may comprise an ML model that may determine a safety confidence score. The safety component 232 may transmit the distance, unsafe condition indication, and/or safety confidence score, to the planning component 234.

The planning component 234 may receive a location and/or orientation of the vehicle 202 from the localization component 228 and/or perception data from the perception component 230 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 234 may comprise hardware/software-in-a-loop in a simulation (e.g., for testing and/or training the planning component 234), the planning component 234 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

In some examples, in order to generate a path, which may comprise multiple contiguous trajectories (e.g., one trajectory begins where another one ends, including a continuous heading, velocity, acceleration, etc.), the planning component 234 may execute a tree search and may determine action node(s) and/or prediction node(s) of the tree search by transmitting a request for the planning component to generate candidate action(s) based at least in part on an environment determined in association with a prediction node. The planning component 234 may receive an initial state of the environment from the perception component 230 (i.e., in association with a root node of the tree search), which the planning component 234 may use to determine one or more candidate actions for a first time period (e.g., 0 to 1 second, 0 to 2 seconds, 0 to 0.5 seconds in the future). For example, the tree search may include executing a Monte-Carlo tree search (MCTS); partially observable Monte-Carlo planning (POMCP); Markov decision process (MDP), such as a partially observable MDP (POMDP); or the like. Additional details regarding the tree search and how to identify the trajectory and/or path to use to control the vehicle 202 are discussed in U.S. patent application Ser. No. 17/394,334, filed Aug. 4, 2021, the entirety of which is incorporated herein. In some examples, the endpoint discussed herein may be used as a final node in a search tree—i.e., the endpoint may be a target node of the tree search. In some examples, the tree search may start at a node associated with the endpoint and search backwards to a current pose and state of the vehicle 202.

In some examples, the planning component 234 may comprise a pickup/drop-off component 236. In some examples, the pickup/drop-off component 236 may be a secondary planning component that is engaged upon receiving an unsafe condition indication from the safety component 232. The pickup/drop-off component 236 may determine a mitigation action and/or may output a suggested mitigation action to a primary planning component of the planning component 234. In some examples, the output of the pickup/drop-off component 236 may override an output of the primary planning component.

The memory 222 and/or 226 may additionally or alternatively store a mapping system, a planning system, a ride management system, etc. Although perception component 230, safety component 232, planning component 234, and/or pickup/drop-off component 236 are illustrated as being stored in memory 222 and/or 226, perception component 230, safety component 232, planning component 234, and/or pickup/drop-off component 236 may include processor-executable instructions, machine-learned model(s) (e.g., a neural network), and/or hardware, such as an ASIC, FPGA, microcontroller, or the like.

As described herein, the localization component 228, perception component 230, safety component 232, planning component 234, pickup/drop-off component 236, and/or other components of the system 200 may comprise one or more ML models. For example, localization component 228, perception component 230, safety component 232, planning component 234, and/or pickup/drop-off component 236 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, the entirety of which is incorporated by reference herein), and/or VoxelNet. Architecture latency optimizations may include MobilenetV2, Shufflenet, Channelnet, Peleenet, and/or the like. The ML model may comprise a residual block such as Pixor, in some examples.

In some examples, the computing device(s) 214 may train the perception component 230, safety component 232, planning component 234, and/or pickup/drop-off component 236 and may transmit un update or the software component itself to the vehicle 202. The log 238 may store sensor data determined by the sensor(s) 206, perception data, planning data, safety condition(s), mitigation action(s), and/or the like. Any of this data may be used to train or refine any of the components discussed herein during ML training. For example, sensor data and/or perception data may be identified by a human as being associated with an unsafe condition for supervised training of the safety component 232. Human safety scores associated with log data may additionally or alternatively be used to train the safety component 232 to indicate a safety confidence score associated with sensor data and/or perception data. In some examples, such a human safety score may include a binary indication of whether a pickup or drop-off is safe or unsafe and the safety confidence score may range between 0 and 1. In an additional or alternate example, the human safety score may be a float or integer value. In yet another example, the safety score used for training may be semi- or fully-automated. For example, the log data may be reviewed by the computing device(s) 214 to detect any collisions, distances between a passenger and a moving object that were less than a threshold distance, and/or the like, any situation of which may be used to indicate an unsafe condition. Such indications may be used in various examples as ground truth by inputting the log data (e.g., any one or more of map data, perception data (e.g., detections, classifications, etc.), prediction data, and the like) into the model and using the indication of the unsafe condition (whether binary, continuous (e.g., how close was a potential collision), etc.) to determine an error and perform relevant backpropagations (in the case of deep learned models, for example) to generate the final, trained, model.

Memory 222 may additionally or alternatively store one or more system controller(s) 240 (which may be a portion of the drive component(s)), which may be configured to control steering, propulsion, braking, safety, emitters, communication, and other systems of the vehicle 202. These system controller(s) 240 may communicate with and/or control corresponding systems of the drive component(s) 212 and/or other components of the vehicle 202. For example, the planning component 234 may generate instructions based at least in part on perception data generated by the perception component 230, such as according the techniques discussed herein, and transmit the instructions to the system controller(s) 240, which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Process

Figure 3:
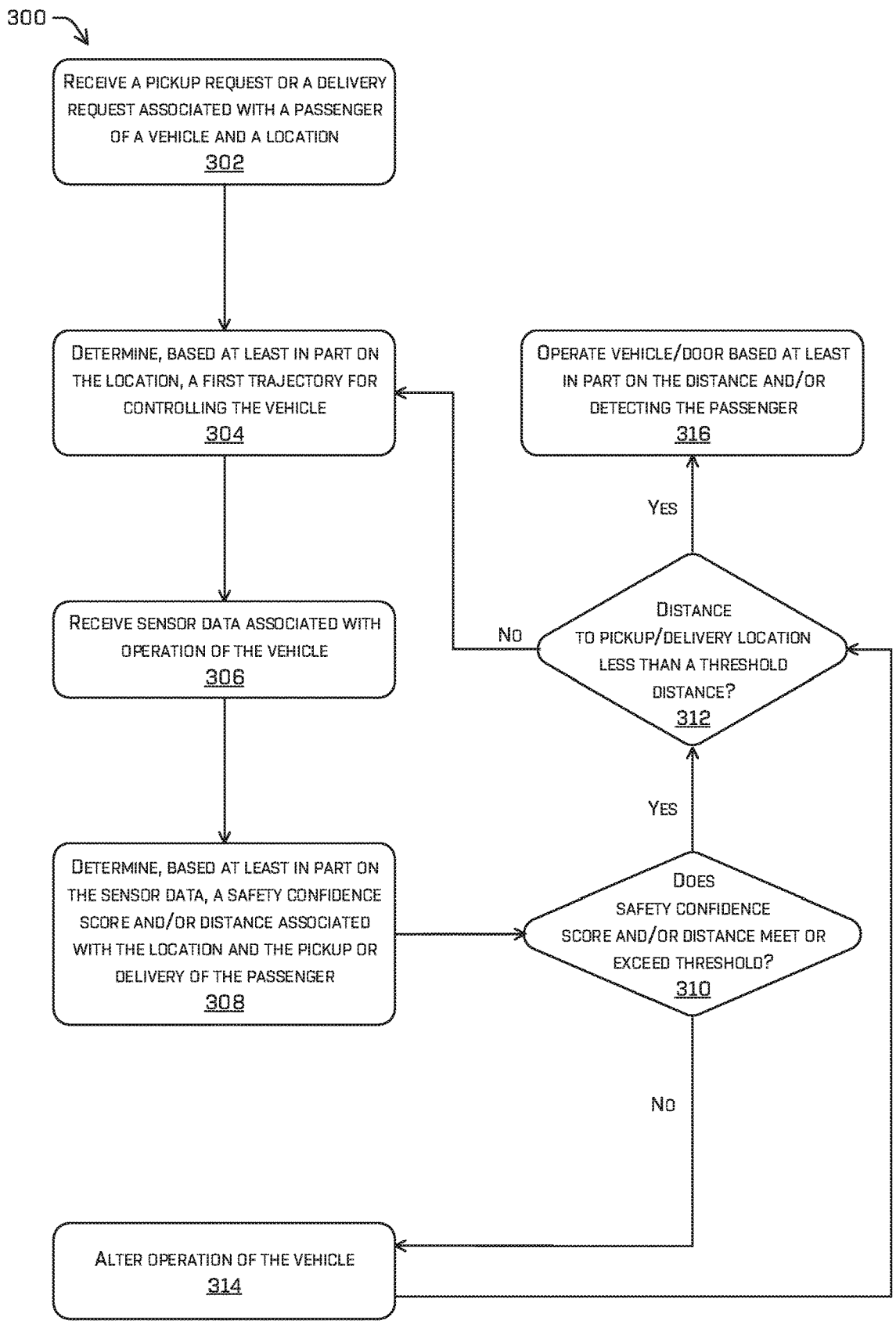
FIG. 3 illustrates a flow diagram of an example process for detecting unsafe condition(s) during pickup and/or delivery of a passenger and unsafe condition mitigation operations.

FIG. 3 illustrates a flow diagram of an example process 300 for detecting unsafe condition(s) during pickup and/or delivery of a passenger and unsafe condition mitigation operations. In some examples, example process 300 may be executed by the passenger safety system discussed herein, which may comprise at least parts of the perception component and/or planning component of the autonomous vehicle, although, as discussed above, it may be a distinct component or comprise distinct component(s) of the perception component and/or planning component. In some examples, example process 300 may be initiated once the vehicle 202 detects that it is within a threshold distance of the pickup and/or delivery location, determining that the vehicle 202 is located on a same block as the pickup and/or delivery location, determining that objects within a threshold distance of the location are detectable by the vehicle 202, and/or the like.

At operation 302, example process 300 may comprise receiving a pickup request or a delivery request associated with a passenger of a vehicle and identifying a location. In some examples, the request may be received from a passenger device or from an input/output device of the vehicle 202, such as an interior or exterior touch screen, microphone, display, and/or the like. The location may indicate a specific coordinate on a map, a building, a business, an event, a block, a region of a city or other feature such as a parking lot (e.g., the "East end of MegaStore' s parking lot," a neighborhood name, a city portion name, a direction), a type of map feature (e.g., airport, bus stop, train stop, park, viewpoint), a block, and/or the like. For example, the location may specify "the nearest park," "a park in the Bronx," or "the Yankees game." In such an example, the planning component may disambiguate the determining a result that is associated with the request. In some examples, the planning component may transmit a verification or a request for additional information or selection of an option to a passenger computing device and/or an input/output device of the vehicle (e.g., a display, a speaker, haptic output).

At operation 304, example process 300 may comprise determining, based at least in part on the location, a first trajectory for controlling the vehicle. Operation 304 may be based at least in part on the planning component determining an endpoint associated with the location based at least in part on the location, map data, perception data, any safety indication(s), and/or sensor data. The endpoint may identify a target pose of the vehicle for the vehicle to arrive at for the vehicle to pick up and/or drop off a passenger. In some examples, once the vehicle reaches the endpoint, the vehicle may make the doors and/or windows available to be opened or may automatically open the doors and/or windows. In some examples, the first trajectory may be based at least in part on an initial endpoint determined by the planning component. Such an initial endpoint may be based on map data and/or sensor data from another vehicle that passed the location (e.g., another autonomous vehicle that passed the location a few minutes ago). In an additional or alternate example where operation 304 is reached from operation 314, operation 304 may be newly determining a trajectory to reach the endpoint at a subsequent time. The trajectory may be the same or different as previously determined. In some examples, the endpoint may be determined to reduce a distance between a final pose of the vehicle and the location identified in the request and/or to position the vehicle such that a door or other aperture is open to a passenger to ingress/egress from/to a pedestrian-safe location, such as a crosswalk, parking space, bike lane (if only so constrained), sidewalk, or the like.

At operation 306, example process 300 may comprise receiving sensor data from one or more sensors, according to any of the techniques discussed herein. The sensor(s) may be associated with the vehicle and/or another computing device. Operation 306 may additionally or alternatively comprise determining perception data, as discussed above, based at least in part on the sensor data. In some examples, the perception component may determine the perception data, which may include determining a curvature of a roadway, detecting the presence of passenger(s) in the vehicle, detecting weather and/or traffic conditions, a jerk and/or acceleration experienced by the vehicle, etc. The perception data may be associated with a most recently received set of sensor data (e.g., a current time, although there may be a small delay between receiving the sensor data and determining the perception data). The vehicle 202 may additionally or alternatively detect an object in the environment (which may include determining a sensor data segmentation associated with the object, a classification associated with the object, associating a previous object detection with the current object detection to indicate that the two detections are associated with a same object, etc.) and determine a predicted trajectory associated with the object. For example, the predicted trajectory may indicate one or more positions of the detected object over future time(s), such as a final position and/or intermediate predicted position(s) of the object. Additionally or alternatively the predicted trajectory may indicate intermediate and/or final velocity(ies) and/or acceleration(s) of the detected object.

At operation 308, example process 300 may comprise determining, based at least in part on the sensor data, a safety confidence score and/or distance based at least in part on the location and the pickup and/or delivery of a passenger. In some examples, a safety confidence score may be determined per region associated with the vehicle (e.g., left side, right side, front back). Operation 308 may include determining an estimated path of the passenger to/from the vehicle. Such an estimated path may be based at least in part on the endpoint determined by the vehicle 202, as discussed above. In some examples, the estimated path may be determined by a discrete ML model trained for such determinations. For example, such an ML model may determine the estimated path based at least in part on supervised training, such as an imitation learning algorithm, that receives passenger paths taken by real passengers based on environment data that indicates a pose of the vehicle 202 and an arrangement/location of object(s) in the environment and/or map data. In other words, such an ML model, once trained, may receive sensor data and/or environment data determined by the perception component and may use such data to output an estimated path. In an additional or alternate example, the vehicle may determine the estimated path based at least in part on a shortest line or curve to the location from the endpoint. In yet an additional or alternate example, determining the estimated path may be based at least in part on detecting or determining the existence of passenger-friendly indications, such as a crosswalk, bike path, sidewalk, or the like and using such indications in map data and/or perception data as anchor points or other points that may affect a determination of the estimated path. For example, such an anchor point may be weighted/have gravity, such that the line/curve associated with the estimated path is drawn towards the anchor point (more as the weight increases). In yet an additional or alternate example, the estimated path may be a corridor (i.e., a region from the endpoint to the location). In an example where the ML model outputs the estimated path/corridor, the corridor may include a probability distribution that identifies a probability that the passenger will occupy a specific location within the corridor.

Operation 308 may include providing various input to the ML model, such as an average or median traffic speed (as detected from sensor data), an object detection (e.g., an identification of the sensor data segmentation associated with an object, an object classification, a top-down representation of the environment including an occupied portion associated with the object, a velocity, heading, acceleration, and/or the like associated with the object) and/or predicted trajectory associated with an object, the estimated path discussed above, a distance between the estimated path and a predicted trajectory, an air visibility, a vehicle reliability state (e.g., an indication of an extent to which a sensor of the vehicle has been degraded, an indication of an extent to which a drive system component has been degraded, such as a tire, steering tie, etc.), whether the autonomous vehicle is holding up traffic, a region that the vehicle determines may be occluded to the passenger, an indication of whether an emergency or law enforcement vehicle has been detected as approaching, a detection of a hazard, a detection of an object classified as an official person making a motion, and/or the like. The hazard may comprise, for example, standing water, an active worksite, a downed power line, or the like. An object detected as an official may be airport personnel, traffic personnel, hotel personnel, or the like and the motion detected may be a detected gesture to not drop off passengers or the like. The ML model may use such data to determine the safety confidence score, which may be a logit, a number between zero and 1, an integer within a specified range, or the like. In an example where the ML model output is a logit, the logit may be normalized using a sigmoid, tan h, or other activation function; rectified linear unit (ReLU); Gaussian error linear unit (GeLU); or the like.

Determining the distance may include determining a shortest distance between the estimated path (whether a line, curve, or corridor) and the closest predicted trajectory. In examples where the estimated path indicates a probability distribution or different likely paths, determining the distance may include determining a distance between a closest point of the predicted trajectory to a location having a probability that meets or exceeds a threshold.

At operation 310, example process 300 may comprise determining whether the safety confidence score meets or exceeds a score threshold and/or whether the distance meets or exceeds a distance threshold. In some examples, the score threshold may be a constant and/or the distance threshold may be based at least in part on an average or median speed of traffic, a speed of the vehicle 202, and/or a speed associated with a detected object and/or the predicted trajectory associated therewith. In another example, the distance threshold may include a minimum distance threshold that is added to as the average speed of traffic or as a predicted trajectory speed increases. In some examples, if the vehicle determines the distance is less than the distance threshold (indicating an unsafe condition), this may override a determination that the safety confidence score meets or exceeds a score threshold (indicating a safe condition), resulting in an unsafe condition indication being output. The reverse may be true—a distance that meets or exceeds a threshold distance (indicating a safe condition) may be overrode by a safety confidence score that is less than the score threshold (indicating an unsafe condition), resulting in an unsafe condition being output. In some examples, just one or the other determination may be made. Regardless, if the safety confidence score and the distance meets or exceeds the respective threshold (or in an example where just one or the other is determined, such one meets or exceeds the respective threshold), example process 300 may transition to operation 312. Otherwise, if the safety confidence score or the distance does not meet the respective threshold (in an example where both a safety confidence score and distance are determined or where just one is determined), example process 300 may transition to operation 314. In some examples, other indications may override an otherwise safe condition, such as the existence of an oncoming emergency or law enforcement vehicle, a moving object existing in a region that may be occluded to a passenger, a speed of traffic that meets or exceeds a threshold, or the like.

In an additional or alternate example, if the distance from the endpoint to the location or the length of the estimated path meets or exceeds a threshold, example process 300 may continue to operation 314. In other words, if the closest the vehicle can get to the location on a drivable surface is beyond a threshold distance, the vehicle may cause a mitigation action to occur in an attempt to shorten that distance, such as by suggesting a new location.

At operation 312, example process 300 may comprise determining whether the distance to the pickup and/or delivery location or endpoint is less than a threshold. To arrive at operation 312, operation 310 would have already determined an indication that the scenario is safe. If the distance to the pickup/delivery location (or the endpoint) is less than a threshold distance, example process 300 may transition to operation 316. If the vehicle is still at a distance from the location or endpoint that is greater than the threshold distance, example process 300 may return to operation 304. In other words, example process 300 may continue to operate nominally to navigate to the endpoint until it is close enough to the endpoint or location to determine whether the pickup/delivery is safe and/or to control the vehicle 202 to a stop.

At operation 316, example process 300 may comprise operating the vehicle and/or door (and/or other components) based at least in part on a distance to the pickup/delivery location (or endpoint) being less than a threshold distance. For example, operation 316 may comprise executing a stopping maneuver and final steering to put the vehicle in position to allow a passenger to depart or embark the vehicle 202. Operation 316 may additionally or alternatively include opening and/or unlocking a door or window, which may be conditioned, in some examples, on first detecting a passenger, verifying a passenger's identity, and/or receiving an indication from the passenger or a passenger device.

If an unsafe condition exists—the safety confidence score or distance is less than a respective threshold, an emergency or law enforcement vehicle is approaching, a moving object exists in a region that may be occluded to a passenger and is moving towards the estimated path, a speed of traffic meets or exceeds a threshold, etc. (any of which may be determined from sensor data by the perception component)—example process 300 may transition to operation 314.

At operation 314, example process 300 may comprise altering operation of the vehicle. Altering operation of the vehicle may comprise altering the first trajectory, determining a new trajectory, altering operation of a component of the vehicle, and/or transmitting a notification to a passenger. This alteration may be a mitigation action that overrides the nominal planning component or is determined by the nominal planning component based at least in part on receiving the unsafe condition from the safety component.

The vehicle may alter operation of the vehicle, such as by modifying a trajectory for controlling the vehicle and/or by altering operation of one or more components of the vehicle, such as a door, window, window tinting, emitter, and/or the like. Modifying the trajectory may include slowing the vehicle to time arrival of the vehicle at the endpoint such that an unsafe condition is mitigated (e.g., an object passes), halting progress of an operation of the vehicle (e.g., pausing or preventing opening of door(s), requiring a door opening device to be actuated multiple times before opening a door or window, stopping the vehicle), recalculating the endpoint (e.g., which may include expanding a zone used by the vehicle to determine the endpoint), determining a trajectory that increases a number of endpoints that are possible as compared to other trajectory(ies), circling the block and coming back, etc. Recalculating the endpoint may be part of or may trigger determining a new trajectory. In some examples, the vehicle 202 may determine a new endpoint by expanding a region that the vehicle searches for space available to the vehicle to park and deliver/pickup safely. In other words, the vehicle 202 may modify the endpoint and may update the drop-off or pickup location accordingly (e.g., which may include transmitting a notification thereof to the passenger), if the distance between the new endpoint and the old location meets or exceeds a distance.

The vehicle may combine any of these mitigation action(s) and/or try different mitigation action(s). For example, after expanding a zone n number of times to look for a more suitable endpoint (where n is a positive integer) and after having not found a safe endpoint, the vehicle 202 may circle the block and come back or determine a new drop-off or pickup location entirely (e.g., a location one block down or around a corner). In some examples, the vehicle may transmit a notification of the unsafe condition and/or the mitigation action to a computing device associated with the passenger and/or via a display and/or emitters of the vehicle. For example, vehicle interior display(s) may provide a video or representation of sensor data associated with the unsafe condition, a notification of the mitigation action(s) being taken, and/or how to override the mitigation action, if applicable (e.g., such as toggling a door activation multiple times).

In some examples, the number of components controlled according to the mitigation action may be based at least in part on a number and/or position of passengers relative to the inside and/or outside of the vehicle. For example, a single door may be prevented from opening for a single passenger on a single side indicated as being unsafe, whereas multiple doors may be prevented from being opened when multiple passengers are present in the vehicle. In some examples, a single door may be prevented from being opened regardless of the number of passengers, such as where a single side of the vehicle is associated with an unsafe condition (e.g., traffic is passing by at a speed that meets or exceeds a threshold on that side). The passenger safety system may cause the mitigating action until the unsafe condition has passed (e.g., one or more safety confidence scores meet or exceed a threshold, the distance meets or exceeds a distance threshold) or until an indication is received from a passenger device overriding.

Of course, though described herein as technique(s) to be performed while approaching the endpoint, the disclosure is not meant to be so limiting. In various examples throughout, the techniques may be used when initially planning a trajectory, when within a radius to an endpoint, iteratively over the entirety of a trip, or the like.

Example Scenarios

Figure 4:
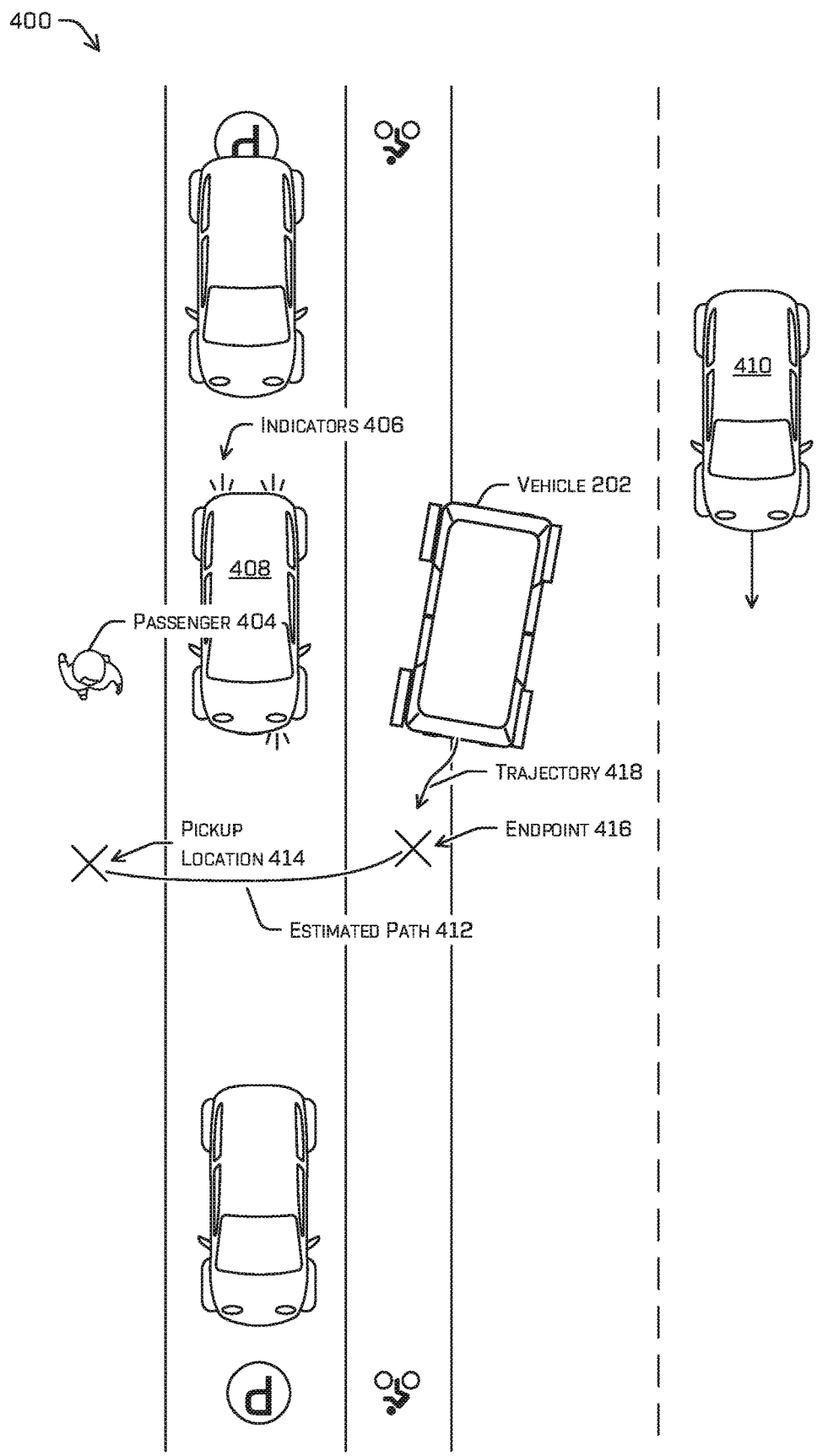
FIG. 4 illustrates an example of a top-down representation of a scenario in which an unsafe condition is detected during passenger pickup and a variety of mitigation operation(s) that the vehicle may execute.

FIG. 4 illustrates an example of a top-down representation of a scenario 400 in which an unsafe condition is detected during passenger pickup. In the example scenario 400 the vehicle 202 approaches an endpoint for picking up passenger 404. The indicators 406 of a vehicle 408 may indicate that such vehicle is attempting to pull out of a parking space and another vehicle, vehicle 410, may be travelling at a normal or illegal speed on the other side of the vehicle 202 from the passenger 404. The vehicle 202 may determine an unsafe condition associated with both the right and/or front side of the vehicle (due to vehicle 408) and the left side of the vehicle (due to vehicle 410). The right side unsafe condition may be determined based at least in part on a distance between a predicted trajectory associated with vehicle 408 and an estimated path 412 between the pickup location 414 specified by a request submitted by the passenger 404 and an endpoint 416 determined by the vehicle 202, or based at least in part on the indicators 406. Based on the unsafe condition on the left side, the vehicle 202 may transmit an indication to a passenger device that the left-side doors are unavailable and/or that the speed of traffic and/or of vehicle 410 meets or exceeds a threshold speed. To additionally or alternatively mitigate the unsafe condition on the right side, the vehicle 202 may determine a trajectory 418 that slows or stops the vehicle 202. Additionally or alternatively, the vehicle 202 may alter the endpoint 416 to mitigate both unsafe conditions, such that the trajectory 418 results in the vehicle 202 parking in front of the vehicle 408, thereby also shortening the estimated path 412. In the depicted example, endpoint 416 may be outdated—it may have been predicated on another vehicle's sensor data that passed five minutes ago when a vehicle was parked in the space in front of vehicle 408 or the endpoint 416 may have been determined as an initial endpoint with the assumption that all the parking spaces would be full.

Figure 5:
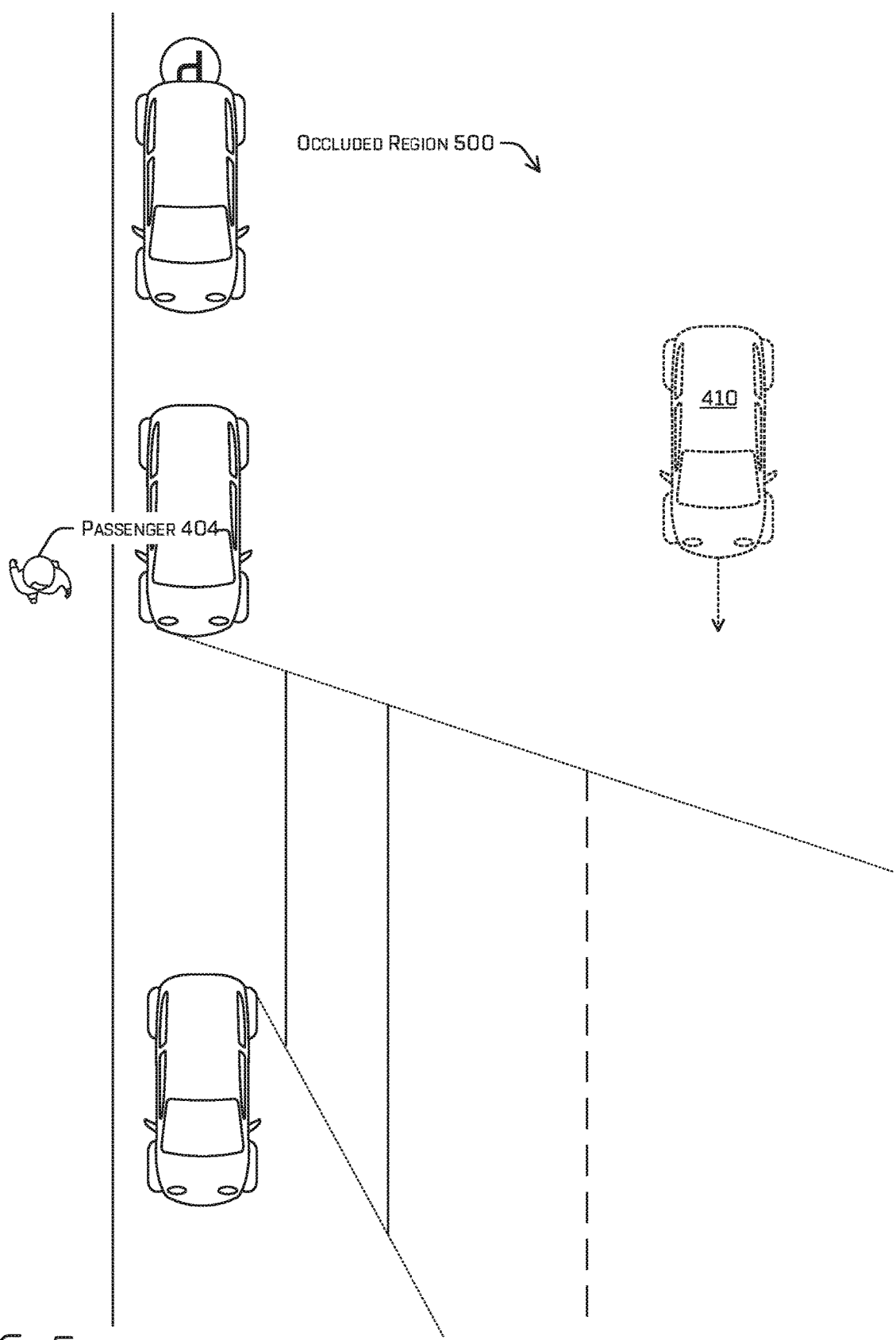
FIG. 5 illustrates a portion of the environment of which the passenger may be aware or occluded region from the passenger's perspective.

FIG. 4 also serves as a basis for an occlusion map illustrated in FIG. 5. FIG. 5 illustrates a portion of the environment of scenario 400 of which the passenger may be aware or occluded region from the passenger's perspective. For simplicity, FIG. 5 depicts the portion of the environment of scenario 400 that the passenger 404 can see—all else would be considered occluded, including the indicators 406. The occlusion map may be determined by the vehicle as part of the vehicle's determination of whether a scenario is safe for a passenger or not. The occlusion map may identify a region that may be hidden to the passenger 404, such as the occluded region 500. The vehicle 202 may determine any detected objects in the occluded region, such as vehicle 410, or objects that are likely to enter the occluded region towards the estimated path. In at least one example, the planning component may base the occupancy of a position in the state space based at least in part on a confidence associated with an indication that a position is or may be occupied. Such confidences are discussed in more detail in U.S. patent application Ser. No. 16/872,284, filed May 11, 2020, the entirety of which is incorporated herein by reference.

Figure 6:
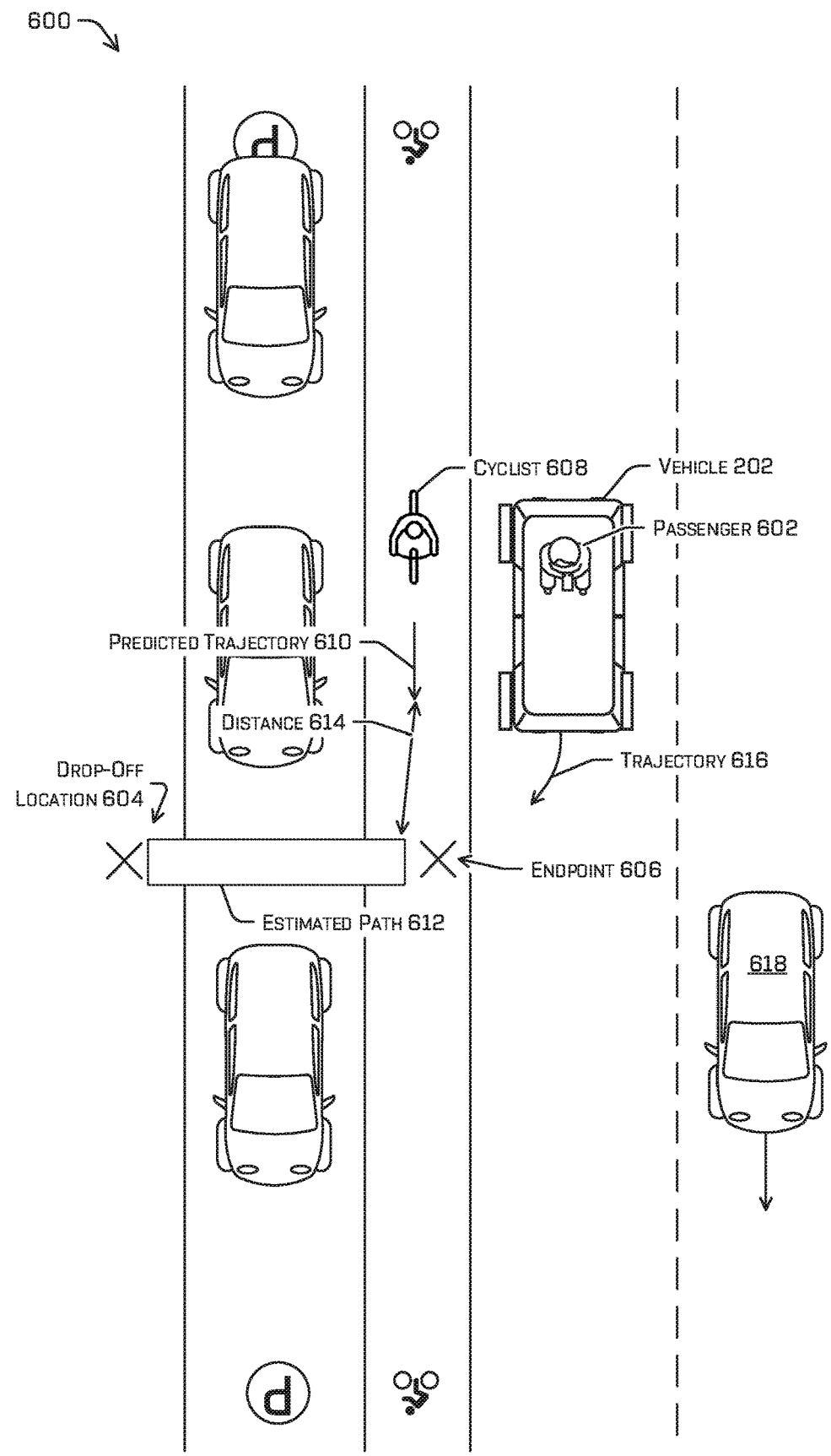
FIG. 6 illustrates an example of a top-down representation of a scenario in which an unsafe condition is detected during passenger delivery and a variety of mitigation operation(s) that the vehicle may execute.

FIG. 6 illustrates another example top-down representation of an example scenario 600 in which an unsafe condition is detected during passenger delivery. Passenger 602 may have requested (via a passenger device and/or an input/output device of the vehicle 202) a drop-off location 604. The vehicle 202 may have determined an endpoint 606 for dropping of the passenger 602 as near to the drop-off location 604 as drivable surfaces, the laws, and detected object(s) allow. As part of determining whether the drop-off is safe, the vehicle 202, may detect cyclist 608, determine a predicted trajectory 610 associated with the cyclist 608, and/or may determine an estimated path 612 (which is a rectangular corridor in the depiction, although other shapes are contemplated) that the passenger may use to arrive at the drop-off location 604. In the depicted example, the predicted trajectory 610 may include a point that is a distance 614 from a closest point of the estimated path 612 that is less than a threshold distance. Because of this, the vehicle 202 may modify the trajectory 616 for arriving at the endpoint 606 to slow the trajectory 616 so that the cyclist 608 is past by the time the vehicle 202 arrives or, if the vehicle 202 has already arrived at the endpoint 606, the vehicle 202 may lock the door on the right side of the vehicle and/or transmit an indication to the passenger device and/or interior input/output devices of the vehicle 202 to notify the passenger 602 of the oncoming cyclist 608. Additionally or alternatively, the vehicle 202 may determine that vehicle 618 is already past the vehicle 202 (and/or that a predicted trajectory associated therewith indicates that the vehicle 618 is past and moving away) and may unlock and/or open a door on the left-side of the vehicle, although this may be reserved for more extreme scenarios since the passenger 602 would exit into a roadway.

Example Clauses

A: A method comprising: receiving a pickup request or a delivery request associated with a passenger of a vehicle and identifying a location for the pickup or delivery of the passenger; determining, based at least in part on the location, a first endpoint for controlling the vehicle; receiving sensor data associated with operation of the vehicle; determining, based at least in part on the sensor data, a safety confidence score associated with the location and the pickup or delivery of the passenger; and altering operation of the vehicle based at least in part on determining that the safety confidence score is less than a threshold confidence score, wherein altering operation of the vehicle comprises altering at least one of the first endpoint or functionality of a door of the vehicle.

B: The method of paragraph A, further comprising transmitting a notification to a computing device associated with the passenger indicating at least one of an unsafe condition or the alteration.

C: The method of either paragraph A or B, wherein determining the safety confidence score comprises: providing input data to a machine-learned model; and receiving the safety confidence score as output from the machine-learned model, wherein the input data is based at least in part on the sensor data and comprises at least one of: a speed or acceleration of an object detected based at least in part on the sensor data; determining that the vehicle is impeding traffic; an average speed of traffic; determining that an emergency vehicle or a law enforcement vehicle is moving towards the vehicle; visibility data; a position of the passenger; a detected hazard; a detected indication by an object classified an official person; or a region that is occluded to the passenger.

D: The method of any one of paragraphs A-C, wherein determining the safety confidence score comprises: determining, based at least in part on the sensor data, a predicted trajectory associated with an object; and determining a path between at least one of the passenger and the location, the passenger and the vehicle, or the vehicle and the location, wherein the safety confidence score is based at least in part on the path and the predicted trajectory.

E: The method of any one of paragraphs A-D, wherein the safety confidence score is a first safety confidence score, the location is a first location, and the altering comprises one or more of: halting or slowing a first trajectory that is based at least in part on the first endpoint until a second safety confidence score is determined that meets or exceeds the threshold confidence score; preventing the door from being opened until the second safety confidence score is determined that meets or exceeds the threshold confidence score; preventing the door from being opened until an object passes the vehicle; preventing the door from being opened until a door control is actuated more than once; determining a second location different than the first location and determining a second trajectory based at least in part on the second location; determining to pass the first location and re-route back to the first location; or emitting at least one of a sound or light via an emitter of the vehicle.

F: The method of any one of paragraphs A-E, wherein: determining the first trajectory is based at least in part on determining a first region around the location; the method further comprises increasing, as a second region, a size associated with the first region based at least in part on determining that the safety confidence score does not meet the threshold; and altering operation of the vehicle comprises determining a second trajectory to a second location within the second region.

G: A system comprising: one or more processors; and a memory storing processor-executable instructions that, when executed by the one or more processors, cause the system to perform operations comprising: receiving a pickup request or a delivery request associated with a passenger of a vehicle and identifying a location for the pickup or delivery of the passenger; determining, based at least in part on the location, a first endpoint for controlling the vehicle; receiving sensor data associated with operation of the vehicle; determining, based at least in part on the sensor data, a safety confidence score associated with the location and the pickup or delivery of the passenger; and altering operation of the vehicle based at least in part on determining that the safety confidence score is less than a threshold confidence score, wherein altering operation of the vehicle comprises altering at least one of the first endpoint or functionality of an aperture of the vehicle.

H: The system of paragraph G, wherein the operations further comprise transmitting a notification to a computing device associated with the passenger indicating at least one of an unsafe condition or the alteration.

I: The system of either paragraph G or H, wherein determining the safety confidence score comprises: providing input data to a machine-learned model; and receiving the safety confidence score as output from the machine-learned model, wherein the input data is based at least in part on the sensor data and comprises at least one of: a speed or acceleration of an object detected based at least in part on the sensor data; determining that the vehicle is impeding traffic; an average speed of traffic; determining that an emergency vehicle or a law enforcement vehicle is moving towards the vehicle; visibility data; a position of the passenger; a detected hazard; a detected indication by an object classified an official person; or a region that is occluded to the passenger.

J: The system of any one of paragraphs G-I, wherein determining the safety confidence score comprises: determining, based at least in part on the sensor data, a predicted trajectory associated with an object; and determining a path between at least one of the passenger and the location, the passenger and the vehicle, or the vehicle and the location, wherein the safety confidence score is based at least in part on the path and the predicted trajectory.

K: The system of any one of paragraphs G-J, wherein the safety confidence score is a first safety confidence score, the location is a first location, and the altering comprises one or more of: halting or slowing a first trajectory that is based at least in part on the first endpoint until a second safety confidence score is determined that meets or exceeds the threshold confidence score; preventing the door from being opened until the second safety confidence score is determined that meets or exceeds the threshold confidence score; preventing the door from being opened until an object passes the vehicle; preventing the door from being opened until a door control is actuated more than once; determining a second location different than the first location and determining a second trajectory based at least in part on the second location; determining to pass the first location and re-route back to the first location; or emitting at least one of a sound or light via an emitter of the vehicle.

L: The system of any one of paragraphs G-K, wherein: determining the first trajectory is based at least in part on determining a first region around the location; the operations further comprise increasing, as a second region, a size associated with the first region based at least in part on determining that the safety confidence score does not meet the threshold; and altering operation of the vehicle comprises determining a second trajectory to a second location within the second region.

M: The system of any one of paragraphs G-L, wherein: determining the first endpoint is based at least in part on reducing a distance between the vehicle and the location; and the altering is further based at least in part on determining the distance meets or exceeds a threshold distance.

N: A non-transitory computer-readable medium storing processor-executable instructions that, when executed by one or more processors, cause one or more processors to perform operations comprising: receiving a pickup request or a delivery request associated with a passenger of a vehicle and identifying a location for the pickup or delivery of the passenger; determining, based at least in part on the location, a first endpoint for controlling the vehicle; receiving sensor data associated with operation of the vehicle; determining, based at least in part on the sensor data, a safety confidence score associated with the location and the pickup or delivery of the passenger; and altering operation of the vehicle based at least in part on determining that the safety confidence score is less than a threshold confidence score, wherein altering operation of the vehicle comprises altering at least one of the first endpoint or functionality of an aperture of the vehicle.

O: The non-transitory computer-readable medium of paragraph N, wherein the operations further comprise transmitting a notification to a computing device associated with the passenger indicating at least one of an unsafe condition or the alteration.

P: The non-transitory computer-readable medium of either paragraph N or O, wherein determining the safety confidence score comprises: providing input data to a machine-learned model; and receiving the safety confidence score as output from the machine-learned model, wherein the input data is based at least in part on the sensor data and comprises at least one of: a speed or acceleration of an object detected based at least in part on the sensor data; determining that the vehicle is impeding traffic; an average speed of traffic; determining that an emergency vehicle or a law enforcement vehicle is moving towards the vehicle; visibility data; a position of the passenger; a detected hazard; a detected indication by an object classified an official person; or a region that is occluded to the passenger.

Q: The non-transitory computer-readable medium of any one of paragraphs N-P, wherein determining the safety confidence score comprises: determining, based at least in part on the sensor data, a predicted trajectory associated with an object; and determining a path between at least one of the passenger and the location, the passenger and the vehicle, or the vehicle and the location, wherein the safety confidence score is based at least in part on the path and the predicted trajectory.

R: The non-transitory computer-readable medium of any one of paragraphs N-Q, wherein the safety confidence score is a first safety confidence score, the location is a first location, and the altering comprises one or more of: halting or slowing a first trajectory that is based at least in part on the first endpoint until a second safety confidence score is determined that meets or exceeds the threshold confidence score; preventing the door from being opened until the second safety confidence score is determined that meets or exceeds the threshold confidence score; preventing the door from being opened until an object passes the vehicle; preventing the door from being opened until a door control is actuated more than once; determining a second location different than the first location and determining a second trajectory based at least in part on the second location; determining to pass the first location and re-route back to the first location; or emitting at least one of a sound or light via an emitter of the vehicle.

S: The non-transitory computer-readable medium of any one of paragraphs N-R, wherein: determining the first trajectory is based at least in part on determining a first region around the location; the operations further comprise increasing, as a second region, a size associated with the first region based at least in part on determining that the safety confidence score does not meet the threshold; and altering operation of the vehicle comprises determining a second trajectory to a second location within the second region.

T: The non-transitory computer-readable medium of any one of paragraphs N-S, wherein: determining the first endpoint is based at least in part on reducing a distance between the vehicle and the location; and the altering is further based at least in part on determining the distance meets or exceeds a threshold distance.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving a pickup request or a delivery request associated with a passenger of a vehicle and identifying a location for pickup or delivery of the passenger;
determining, based at least in part on the location, a first endpoint for controlling the vehicle and a region of an environment that is occluded to the passenger when positioned at the location or would be occluded to the passenger at the first endpoint;
receiving sensor data associated with operation of the vehicle;
determining, based at least in part on the sensor data, an environment state comprising at least one of an object detection or a predicted trajectory associated with an object;
determining, based at least in part on the environment state and the location, whether the object or the predicted trajectory of the object falls within the region of the environment;
based on determining whether the object or the predicted trajectory of the object falls within the region of the environment, determining a safety confidence score associated with the location for the pickup or delivery of the passenger; and
altering operation of the vehicle based at least in part on determining that the safety confidence score is less than a threshold confidence score, wherein altering the operation of the vehicle comprises altering at least one of the first endpoint or functionality of a door of the vehicle.

2. The method of claim 1, further comprising transmitting a notification to a computing device associated with the passenger indicating at least one of an unsafe condition or altering the operation of the vehicle.

3. The method of claim 1, wherein determining the safety confidence score comprises:
providing input data to a machine-learned model; and
receiving the safety confidence score as output from the machine-learned model, wherein the input data is based at least in part on the sensor data and comprises at least one of:
a speed or acceleration of the object detected based at least in part on the sensor data;
determining that the vehicle is impeding traffic;
an average speed of traffic;
determining that an emergency vehicle or a law enforcement vehicle is moving towards the vehicle;
visibility data;
a position of the passenger;
a detected hazard;

a detected indication by a second object classified as an official person; or
the region that is occluded to the passenger.

4. The method of claim 1, wherein the safety confidence score is a first safety confidence score, the location is a first location, and altering the operation of the vehicle comprises one or more of:
halting or slowing a first trajectory that is based at least in part on the first endpoint until a second safety confidence score is determined that meets or exceeds the threshold confidence score;
preventing the door from being opened until the second safety confidence score is determined that meets or exceeds the threshold confidence score;
preventing the door from being opened until the object passes the vehicle;
preventing the door from being opened until a door control is actuated more than once;
determining a second location different than the first location and determining a second trajectory based at least in part on the second location;
determining to pass the first location and re-route back to the first location; or
emitting at least one of a sound or light via an emitter of the vehicle.

5. The method of claim 1, further comprising:
determining, based at least in part on the sensor data and a first region around the location, a first trajectory for controlling the vehicle; and wherein altering the operation of the vehicle comprises:
increasing, as a second region, an area associated with the first region; and
determining a second trajectory to a second location within the second region.

6. The method of claim 1, further comprising:
determining, by a machine-learned model based at least in part on the environment state, a set of likelihoods associated with a set of paths, wherein a first likelihood associated with a first path of the set of paths indicates the first likelihood that the passenger will travel the first path; and
determining, from among the set of paths, an obstacle-free path between at least one of the passenger and the location or the passenger and the vehicle as having a greatest likelihood from among the set of likelihoods.

7. A system comprising:
one or more processors; and
a memory storing processor-executable instructions that, when executed by the one or more processors, cause the system to perform operations comprising:
receiving a pickup request or a delivery request associated with a passenger of a vehicle and identifying a first location for pickup or delivery of the passenger;
determining, based at least in part on the first location, a first endpoint for controlling the vehicle and a region of an environment that is occluded to the passenger when positioned at the first location or would be occluded to the passenger at the first endpoint;
receiving sensor data associated with operation of the vehicle;
determining, based at least in part on the sensor data, an environment state comprising at least one of an object detection or a predicted trajectory associated with an object;
determining, based at least in part on the environment state and the first location, whether the object or the predicted trajectory of the object falls within the region of the environment;
based on determining whether the object or the predicted trajectory of the object falls within the region of the environment, determining a first safety confidence score associated with the first location for the pickup or delivery of the passenger; and
altering the operation of the vehicle based at least in part on determining that the first safety confidence score is less than a threshold confidence score, wherein altering the operation of the vehicle comprises altering at least one of: the first endpoint or functionality of a door of the vehicle.

8. The system of claim 7, wherein the operations further comprise transmitting a notification to a computing device associated with the passenger indicating at least one of an unsafe condition or altering the operation of the vehicle.

9. The system of claim 7, wherein determining the first safety confidence score comprises:
providing input data to a machine-learned model; and
receiving the first safety confidence score as output from the machine-learned model, wherein the input data is based at least in part on the sensor data and comprises at least one of:
a speed or acceleration of the object detected based at least in part on the sensor data;
determining that the vehicle is impeding traffic;
an average speed of traffic;
determining that an emergency vehicle or a law enforcement vehicle is moving towards the vehicle;
visibility data;
a position of the passenger;
a detected hazard;
a detected indication by a second object classified as an official person; or
a region that is occluded to the passenger.

10. The system of claim 7, wherein determining the first safety confidence score comprises:
determining a path between at least one of the passenger and the first location, the passenger and the vehicle, or the vehicle and the first location,
wherein the first safety confidence score is based at least in part on the path and the predicted trajectory.

11. The system of claim 7, wherein:
determining the first endpoint is based at least in part on reducing a distance between the vehicle and the first location; and
altering the operation of the vehicle is further based at least in part on determining the distance meets or exceeds a threshold distance.

12. A non-transitory computer-readable medium storing processor-executable instructions that, when executed by one or more processors, cause the one or more processors to perform operations comprising:
receiving a pickup request or a delivery request associated with a passenger of a vehicle and identifying a first location for pickup or delivery of the passenger;
determining, based at least in part on the first location, a first endpoint for controlling the vehicle;
receiving sensor data associated with operation of the vehicle;
determining, based at least in part on the first location, a region of an environment that is occluded to the passenger when positioned at the first location or would be occluded to the passenger at the first endpoint;

determining, based at least in part on the sensor data, an environment state comprising at least one of an object detection or a predicted trajectory associated with an object;

determining, based at least in part on the environment state and the first location, whether the object or the predicted trajectory of the object falls within the region of the environment;

based on determining whether the object or the predicted trajectory of the object falls within the region of the environment, determining a safety confidence score associated with the pickup or delivery of the passenger from the first location; and altering the operation of the vehicle based at least in part on determining that the safety confidence score is less than a threshold confidence score, wherein altering the operation of the vehicle comprises altering at least one of the first endpoint or functionality of an aperture of the vehicle.

13. The non-transitory computer-readable medium of claim 12, wherein the operations further comprise transmitting a notification to a computing device associated with the passenger indicating at least one of an unsafe condition or altering the operation of the vehicle.

14. The non-transitory computer-readable medium of claim 12, wherein determining the safety confidence score comprises:

providing input data to a machine-learned model; and receiving the safety confidence score as output from the machine-learned model, wherein the input data is based at least in part on the sensor data and comprises at least one of:

a speed or acceleration of an object detected based at least in part on the sensor data;

determining that the vehicle is impeding traffic;

an average speed of traffic;

determining that an emergency vehicle or a law enforcement vehicle is moving towards the vehicle;

visibility data;

a position of the passenger;

a detected hazard; or a detected indication by an additional object classified as an official person.

15. The non-transitory computer-readable medium of claim 12, wherein determining the safety confidence score comprises:

determining a path between at least one of the passenger and the first location, the passenger and the vehicle, or the vehicle and the first location, wherein the safety confidence score is based at least in part on the path and the predicted trajectory.

16. The non-transitory computer-readable medium of claim 12, wherein the safety confidence score is a first safety confidence score and altering the operation of the vehicle comprises one or more of:

halting or slowing a first trajectory that is based at least in part on the first endpoint until a second safety confidence score is determined that meets or exceeds the threshold confidence score;

preventing the aperture from being opened until the second safety confidence score is determined that meets or exceeds the threshold confidence score;

preventing the aperture from being opened until an object passes the vehicle;

preventing the aperture from being opened until an aperture control is actuated more than once;

determining a second location different than the first location and determining a second trajectory based at least in part on the second location;

determining to pass the first location and re-route back to the first location; or emitting at least one of a sound or light via an emitter of the vehicle.

17. The non-transitory computer-readable medium of claim 12, wherein the operations further comprise:

determining, based at least in part on the sensor data and a first region around the first location, a first trajectory for controlling the vehicle; and wherein altering the operation of the vehicle comprises:

increasing, as a second region, an area associated with the first region; and determining a second trajectory to a third location within the second region.

18. The non-transitory computer-readable medium of claim 12, wherein:

determining the first endpoint is based at least in part on reducing a distance between the vehicle and the first location; and altering the operation of the vehicle is further based at least in part on determining the distance meets or exceeds a threshold distance.

19. The non-transitory computer-readable medium of claim 12, wherein the operations further comprise:

determining, based at least in part on the sensor data and the first endpoint, a second location for pickup or delivery of the passenger, different than the first location, wherein the second location is based at least in part on determining an estimated path that the passenger is likely to take between the first location and the vehicle.

20. The non-transitory computer-readable medium of claim 19, wherein the operations further comprise:

determining, based at least in part on the sensor data, an object located in the region that is occluded to the passenger when positioned at the second location, wherein the safety confidence score is based at least in part on a trajectory of the object.

* * * * *